(12) United States Patent
Qiao et al.

(10) Patent No.: US 8,735,795 B2
(45) Date of Patent: May 27, 2014

(54) IMAGE SENSOR WITH INTEGRATED AMBIENT LIGHT DETECTION

(75) Inventors: Wenhao Qiao, Milpitas, CA (US);
Zheng Yang, San Jose, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 240 days.

(21) Appl. No.: 13/355,165

(22) Filed: Jan. 20, 2012

(65) Prior Publication Data

US 2013/0187027 A1    Jul. 25, 2013

(51) Int. Cl.
*H01L 27/00*    (2006.01)

(52) U.S. Cl.
USPC .................................. 250/208.1; 250/214 AL (58) Field of Classification Search
USPC ................... 250/208.1, 214 AL, 205, 214 R; 348/294–324; 396/98; 257/440
See application file for complete search history.

(56) References Cited

U.S. PATENT DOCUMENTS

| | | | |
|---|---|---|---|
| 6,469,289 B1 * | 10/2002 | Scott-Thomas et al. ... | 250/208.1 |
| 6,975,008 B2 | 12/2005 | Cok | |
| 7,605,359 B2 | 10/2009 | Dai et al. | |
| 7,683,305 B2 | 3/2010 | Solhusvik et al. | |
| 2005/0088567 A1 | 4/2005 | Kim | |
| 2005/0224691 A1 | 10/2005 | Van Arendonk et al. | |
| 2007/0230941 A1 | 10/2007 | Smith et al. | |

FOREIGN PATENT DOCUMENTS

| | | |
|---|---|---|
| JP | 2009-010697 A | 1/2009 |
| KR | 10-2012-0000264 A | 1/2012 |

OTHER PUBLICATIONS

PCT/US2012/072180; PCT International Search Report and Written Opinion of the International Searching Authority, mailed May 29, 2013, 10 pages.

* cited by examiner

*Primary Examiner* — Que T Le
(74) *Attorney, Agent, or Firm* — Blakely Sokoloff Taylor & Zafman LLP (57) ABSTRACT

An image sensor having an image acquisition mode and an ambient light sensing mode includes a pixel array having pixel cells organized into rows and columns for capturing image data and ambient light data. Readout circuitry is coupled via column bit lines to the pixels cells to read out the image data along the column bit lines. An ambient light detection ("ALD") unit is selectively coupled to the pixel array to readout the ambient light data and to generate an ambient light signal based on ambient light incident upon the pixel array. Control circuitry is coupled to the pixel array to control time sharing of the pixels cells between the readout circuitry during image acquisition and the ALD unit during ambient light sensing.

18 Claims, 6 Drawing Sheets

IMAGE SENSOR WITH INTEGRATED AMBIENT LIGHT DETECTION

TECHNICAL FIELD

This disclosure relates generally to image sensors, and in particular but not exclusively, relates to ambient light detectors.

BACKGROUND INFORMATION

Image sensors have become ubiquitous. They are widely used in digital still cameras, cellular phones, security cameras, medical devices, automobiles, portable electronic devices and other applications. The technology used to manufacture image sensors, and in particular CMOS image sensor ("CIS"), has continued to advance at a great pace. Modern image sensor applications place demands for faster processing speeds and better image quality, while simultaneously expecting miniaturization in the physical size of the image sensor.

Some electronic devices, as such cell phones and cameras, include multiple image sensors to perform different functions, such as, capturing images and monitoring ambient light levels for measuring the luminance of an environment. In some cases, a single image sensor may include two separate and distinct arrays of pixel cells, one dedicated for the sole purpose of image acquisition and the other dedicated for the sole purpose of ambient light detection. These standalone devices or single purpose pixel cell arrays increase the complexity, expense, and power consumption of consumer electronics that include both an image sensor array for image capture and an image sensor array for ambient light detection.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an image sensor with integrated image acquisition and ambient light detection functions that time share a single pixel array are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

References throughout this specification to "one embodiment" or "an embodiment" means that a particular feature, structure, process, block or characteristic described in connection with an embodiment included in at least one embodiment of the present invention. Thus, the appearance of the phrases "in one embodiment" or "in an embodiment" in various places throughout this specification does not necessarily mean that the phrases all refer to the same embodiment. The particular features, structures or characteristics may be combined with any suitable manner in one or more embodiments.

Figure 1:
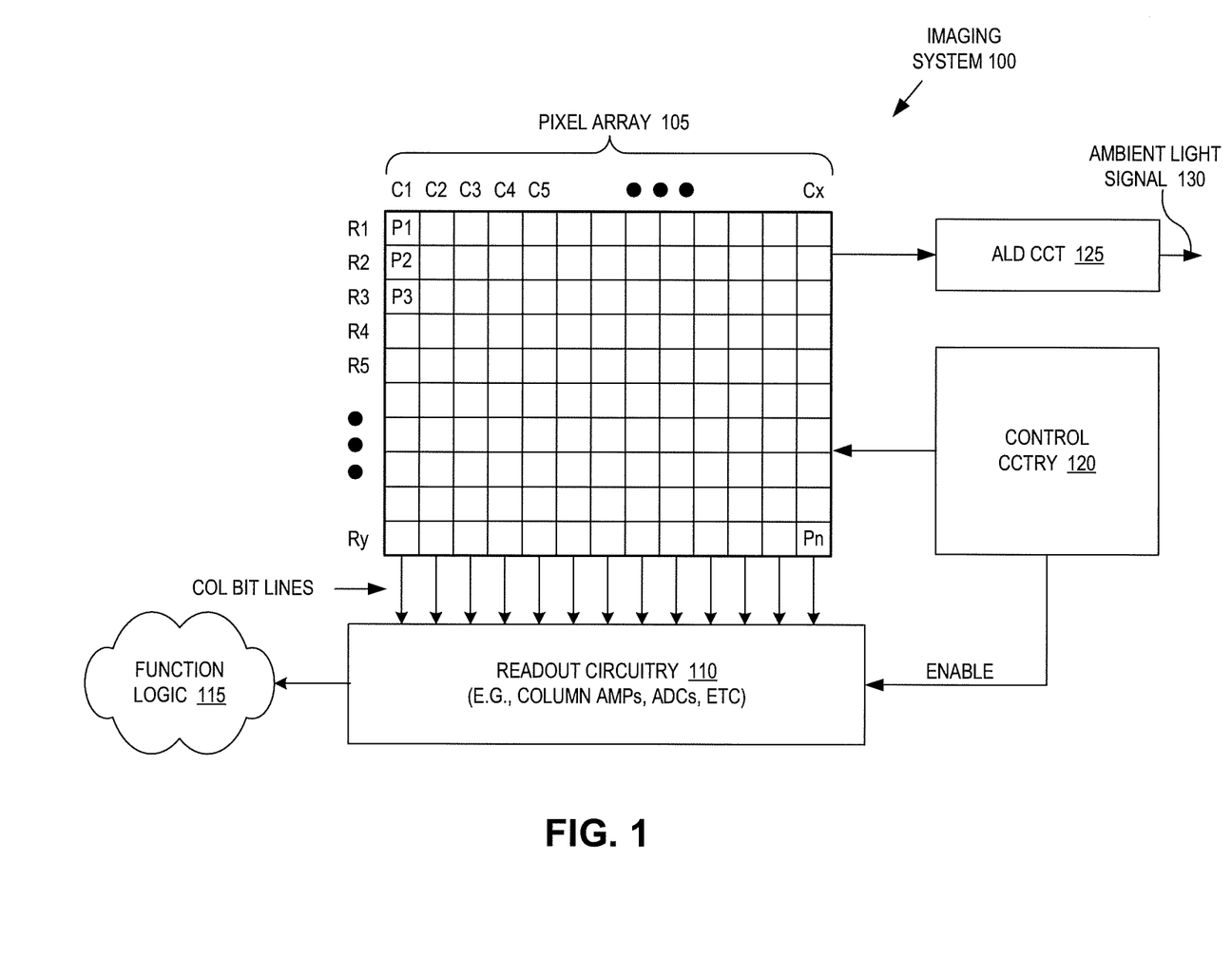
FIG. 1 is a functional block diagram illustrating an imaging system with image acquisition and ambient light detection integrated to time share a single pixel array, in accordance with an embodiment of the disclosure.

FIG. 1 is a functional block diagram illustrating an imaging system 100 with image acquisition and ambient light detection ("ALD") integrated to time share a single pixel array, in accordance with an embodiment of the disclosure. The illustrated embodiment imaging system 100 includes pixel array 105, readout circuitry 110, function logic 115, control circuitry 120, and an ALD circuit 125.

Pixel array 105 is a two-dimensional (2D) array of imaging sensor cells or pixel cells (e.g., pixels P1, P2, . . . , Pn). In one embodiment, each pixel cell is a complementary metal-oxide-semiconductor (CMOS) imaging pixel. In another embodiment, each pixel cell is a charged-coupled device (CCD) imaging pixel. Pixel array 105 may be implemented as a front-side illuminated image sensor or a backside illuminated image sensor. As illustrated, each pixel cell is arranged into a row (e.g., rows R1 to Ry) and a column (e.g., column C1 to Cx) to acquire image data of a person, place or object, which can then be used to render an image of the person, place or object.

After each pixel has acquired its image data or image charge, the image data is readout by readout circuitry 110 and transferred to function logic 115. Readout circuitry 110 may include column amplification circuitry, analog-to-digital (ADC) conversion circuitry, or otherwise. Function logic 115 may simply store the image data or even manipulate the image data by applying post image effects (e.g., crop, rotate, remove red eye, adjust brightness, adjust contrast or otherwise). In one embodiment, readout circuitry 110 may readout a row of image data at a time along readout column lines or may readout the image data using a variety of other techniques (not illustrated), such as serial readout, column readout along readout row lines, or a full parallel readout of all pixels simultaneously. It should be appreciated that the designation of a line of pixel cells within pixel array 105 as either a row or a column is arbitrary and one of rotational perspective. As such, the use of the terms "row" and "column" are intended merely to differentiate the two axes relative to each other.

Control circuitry 120 is coupled to pixel array 105 and includes logic and driver circuitry for controlling operational characteristics of pixel array 105. For example, reset, row select, transfer, and global shutter signals may be generated by control circuitry 120. Control circuitry 120 may include a row driver, a global shutter driver, as well as other control logic. Control circuitry 120 may generate the shutter signal for controlling image acquisition. In one embodiment, the shutter signal is a global shutter signal for simultaneously enabling all pixels within pixel array 105 to simultaneously capture their respective image data during a single acquisition window. In an alternative embodiment, the shutter signal is a rolling shutter signal whereby each row, column, or group of pixels is sequentially enabled during consecutive rolling acquisition windows.

In one embodiment, imaging system 100 is a subsystem included within a larger electronic system. The electronic system may be a mobile phone, a computer, a digital camera, a medical device, or otherwise, and may further include a computing or processing unit for system level operation or other functionality of the electronic system. For example, the electronic system may be a mobile phone that also includes a central processor unit and radio frequency or microwave electronics for wireless communications.

Imaging system 100 operates in two modes of operation: 1) image acquisition mode and 2) ambient light sensing mode (also referred to as ALD mode). During image acquisition mode, pixel array 105 is operated by control circuit 120 to acquire image data for generating a picture and the image data is readout via readout circuitry 110. During ambient light sensing mode, control circuitry 120 operates pixel array 105 to acquire ambient light data, which is read into ALD circuit 125 for the purpose of generating one or more ambient light signals 130. Thus, ALD circuit 125 and readout circuitry 110 time share pixel array 105 and the same pixels cells are used for both image acquisition and ambient light sensing. Time sharing pixel array 105 enables a number of possible applications without sacrificing image resolution or die real estate within in pixel array 105, since the individual pixels cells are time shared and not separately assigned to single purpose functions. In one application, the same pixel array 105 that is used to acquire image data (pictures) can also be used for motion or proximity detection. For example, a tablet can be placed into a sleep mode, while ALD circuit 125 remains active. When a user waves his hand in front of pixel array 105, motion is detected and an interrupt signal issued to wake up the tablet. In a cell phone, ALD circuit 125 can issue interrupt signals based upon the sensed ambient brightness or illumination to turn off the screen when the phone is held against an ear and wake up the screen when the user removes the phone from the ear. ALD circuit 125 can further enable motion detection in security cameras, be implemented in a cell phone to measure luminance and color as a sort of photographer's light meter, and in a television set be integrated into a built in camera module used for video conferencing or a human gesture interface that also serves to monitor ambient brightness for backlight and/or color control and motion sensing to turn on the television. These and other applications may be facilitated by time sharing a single pixel array for both image acquisition and ambient light sensing.

By time sharing a single pixel array 105 for both image acquisition and ambient light detection, an image sensor with a single pixel array is capable of implementing both functions, which reduces overall device complexity, cost, and power consumption. Power consumption of imaging system 100 can be further improved by disabling readout circuitry 110, and evening a portion of the in-pixel circuitry (e.g., source follower transistor), during ambient light sensing, since these components may be idle during this mode of operation. Thus, not only does imaging system 100 provide a cost effective solution for both image acquisition and ALD, but the ALD functionality is a low power solution well suited for portable electronics with limited power budgets.

Figure 2:
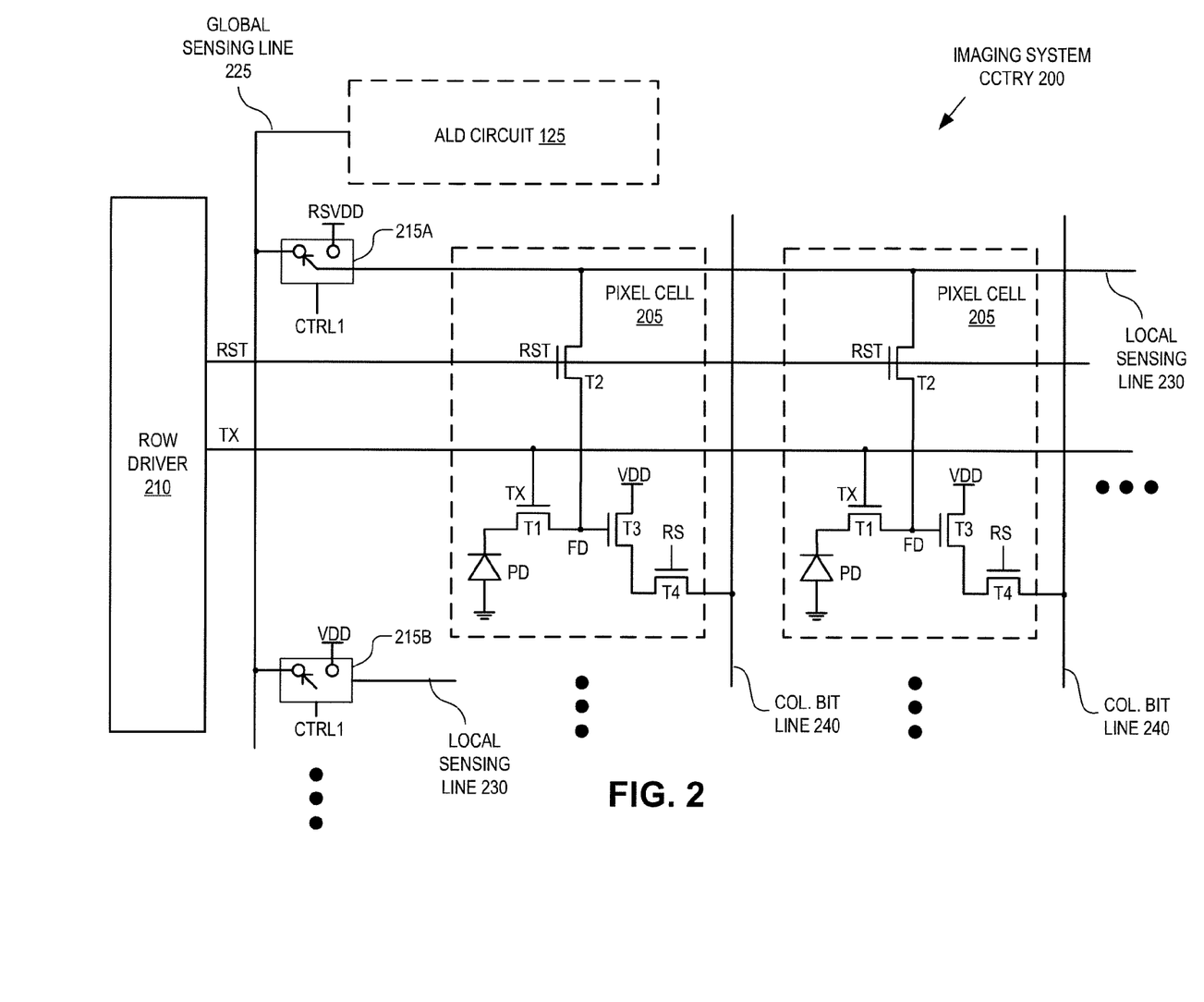
FIG. 2 illustrates circuitry of an imaging system having a rolling shutter pixel array integrated with image acquisition and ambient light detection ("ALD") functionality, in accordance with an embodiment of the disclosure.

FIG. 2 illustrates circuitry of an imaging system 200 having a rolling shutter pixel array that is time shared for both image acquisition and ALD functionality, in accordance with an embodiment of the disclosure. Imaging system 200 is one possible implementation of imaging system 100, but FIG. 2 only illustrates those components necessary to effectively describe the embodiment. FIG. 2 illustrates two pixel cells 205 within a given row, a row driver 210, switches 215A and 215B (collectively referred to as switches 215), ALD circuit 125, a global sensing line 225, and local sensing lines 230. Each pixel cell 205 includes a photo-sensor PD (e.g., photodiode), a transfer transistor T1, a reset transistor T2, a source-follower (SF) transistor T3, and row select (RS) transistor T4.

Imaging system 200 operates in two modes: an image acquisition mode and an ambient light sensing mode. During image acquisition mode, transfer transistor T1 receives a transfer signal TX from row driver 210, which transfers the charge accumulated in photo-sensor PD to a floating diffusion (FD) node. During the image acquisition mode, control signals CTRL1 are asserted to couple local sensing lines 230 to RSVDD. Thus, reset transistor T2 is coupled between a power rail RSVDD and the FD node to reset the pixel cell 205 (e.g., discharge or charge the FD node and the photo-sensor PD to a preset voltage) under control of a reset signal RST.

The FD node is coupled to control the gate terminal of the source-follower transistor T3, which provides a high impedance output to the FD node. Source-follower transistor T3 is coupled between power rail VDD and the RS transistor T4 and generates a current through its channel that is indicative of the charge at the FD node. RS transistor T4 selectively couples the output of the pixel cell to the readout line or column bit line 240 under control of the row select signal RS.

In image acquisition mode, the photo-sensor PD and the FD node are reset by temporarily asserting the reset signal RST and the transfer signal TX. The image acquisition window (e.g., exposure period) is commenced by de-asserting the transfer signal TX and permitting incident light to charge the photo-sensor PD. Since the transfer signal TX is controlled on a row-by-row basis, imaging system 200 is said to have a rolling shutter that is facilitated via the assertion of the transfer signal TX. As photo-generated electrons accumulate within the photo-sensor PD, its voltage decreases (electrons are negative charge carriers). The voltage or charge on the photo-sensor PD is indicative of the intensity of the light incident on the photo-sensor PD during the exposure period. At the end of the exposure period, the reset signal RST is de-asserted to isolate the FD node and transfer signal TX is asserted to couple the photo-sensor PD to the FD node. The charge transfer causes the voltage of the FD node to drop by an amount proportional to photo-generated electrons accumulated within the photo-sensor PD during the exposure period.

During the ambient light sensing mode, row driver 210 asserts the reset signal RST and the transfer signal TX to close circuit both transistors T1 and T2 and establish a conducting path from the photo-sensor PD through the channels of transistors T1 and T2 to local sensing line 230. Additionally, control signals CTRL1 cause switches 215 to coupled local sensing lines 230 to global sensing line 225 and ALD circuit 125. During the ambient light sensing mode, incident ambient light is permitted to charge photo-sensor PD; however, in some cases the intensity of the ambient light may be less than the intensity of incident image light during the image capture mode. Charge accumulated on photo-sensors PD in each row is summed on local sensing lines 230 through transfer transistor T1 and reset transistor T2 and then summed among rows on global sensing line 225. The summed charges are then coupled into ALD circuit 125.

Figure 3:
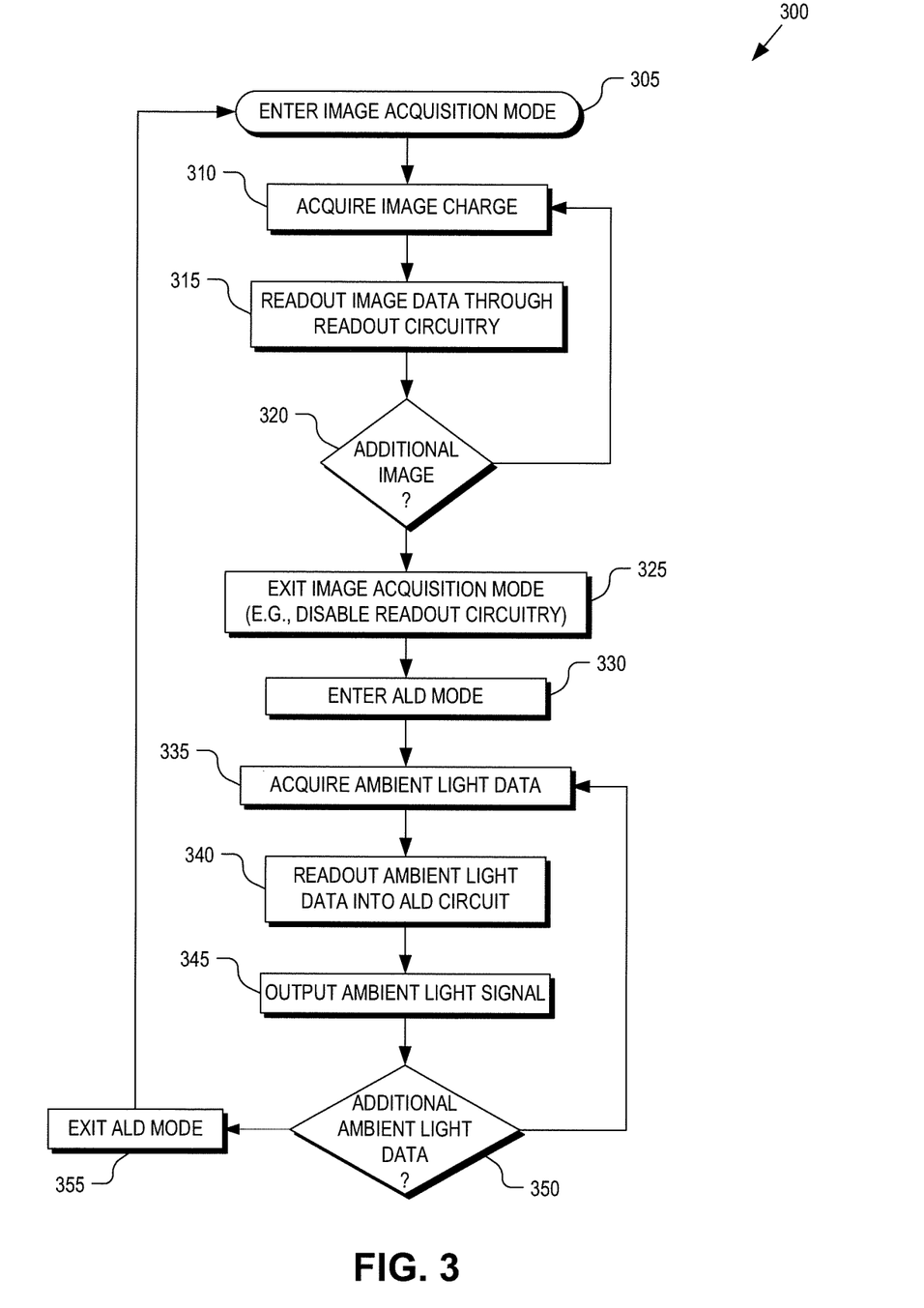
FIG. 3 is a flow chart illustrating a process for time sharing a pixel array between readout circuitry for image acquisition and an ALD circuit for ambient light detection, in accordance with an embodiment of the disclosure.

FIG. 3 is a flow chart illustrating a process 300 for time sharing a pixel array (e.g., pixel array 105) between readout circuitry 110 for image acquisition and ALD circuit 125 for ambient light detection, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, imaging system 100 enters an image acquisition mode. This transition may be controlled via logic (e.g., state machine) within control circuitry 120. While in image acquisition mode, readout circuitry 110 and in pixel circuitry is fully enabled and control signals CTRL1 configure switches 215 to couple RSVDD onto local sensing lines 230. In process block 310, the pixel cells (e.g., pixel cells 205) within pixel array 105 accumulate charges based upon the incident image light and image data indicative of the accumulated charges are readout via column bit lines 240 into readout circuitry 110 (process block 315). The image acquisition mode may last long enough to capture a single image or may continue for several image acquisition cycles depending upon design choice. If additional images are to be acquired (decision block 320), then process 300 returns to process block 310. Otherwise, process 300 proceeds to a process block 325 and exits the image acquisition mode. In one embodiment, exiting the image acquisition mode includes de-powering or otherwise disabling some or all of readout circuitry 110 to reduce it power consumption when not in use. For example, the column amplifiers and ADCs may have their supply voltages disabled or reduced via a power switch. In one embodiment, exiting image acquisition mode also causes some of the in-pixel circuitry to be disabled for power conservation. For example, VDD applied to the high side channel of source-follower transistor T3 may be reduced or disabled to conserve power.

In a process block 330, imaging system 100 enters the ambient light sensing mode (ALD mode). Again, this transition may be controlled via logic within control circuitry 120. In ALD mode, control signals CTRL1 configure switches 215 to couple local sensing lines 230 to global sensing line 225. With this configuration, ALD circuit 125 is selectively coupled into pixel cells 205 through reset transistors T2 and under control of the reset signal RST. In a process block 335, ambient light data is acquired by exposing pixel array 105 to incident ambient light. The ambient light data is transferred to the FD node via assertion of the transfer signal TX and coupled onto local sensing line 230 via assertion of the reset signal RST. In one embodiment, the transfer signal TX and the reset signal RST remain asserted (e.g., coupled to VDD) when in the ambient light sensing mode. In this manner, the ambient light data acquired by each pixel cell 205 in a row is summed by a given local sensing line 230 and local sensing lines 230 are summed onto global sensing line 225, thereby providing a summed ambient light value to ALD circuit 125 for the entire pixel array 105 (process block 340). In a process block 345, ALD circuit 125 analyzes the ambient light data to generate an ambient light signal indicative of the ambient light incident upon pixel array 105. Operation of ALD circuit 125 is discussed in greater detail in connection with FIGS. 5 and 6. The ALD mode may last long enough to capture a single set of summed ambient light data or may continue for several cycles depending upon design choice. If additional cycles are to be executed (decision block 350), then process 300 returns to process block 335. Otherwise, process 300 proceeds to a process block 355 and exits the ALD mode.

Figure 4:
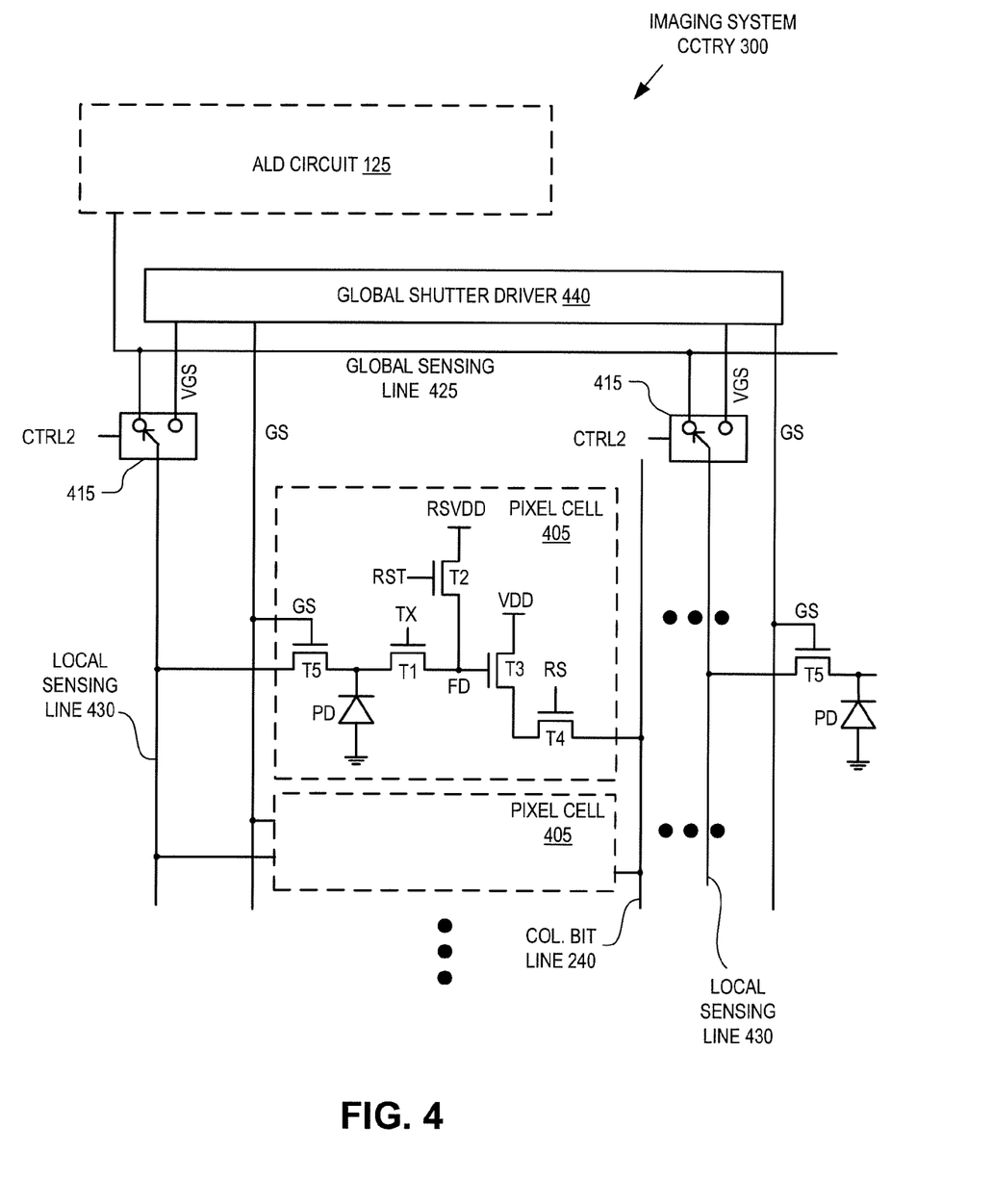
FIG. 4 illustrates circuitry of an imaging system having a global shutter pixel array integrated with image acquisition and ALD functionality, in accordance with an embodiment of the disclosure.

FIG. 4 illustrates circuitry of an imaging system 400 having a global shutter pixel array integrated with image acquisition and ALD functionality, in accordance with an embodiment of the disclosure. Imaging system 400 is one possible implementation of imaging system 100, but FIG. 4 only illustrates those components necessary to effectively describe the embodiment. FIG. 4 illustrates the internal components of a single pixel cell 405.

Pixel cells 405 are similar to pixel cells 205, but also include a global shutter transistor T5 having its channel coupled between local sensing line 430 and the photo-sensor PD and a gate terminal coupled to receive a global shutter signal GS from global shutter driver 440. Local sensing lines 430 couple columns of pixel cells 405 to global sensing line 425 via switches 415 in response to control signal CTRL2. In this embodiment, the ambient light data is read out of pixel array 105 through global shutter transistor T5 via assertion of the global shutter signal GS. Furthermore, the high channel side of the reset transistor T2 is permanently coupled to the RSVDD power rail.

During the image acquisition mode of operation, switches 415 are configured to couple the voltage VGS from global shutter driver 440 to the channel of global shutter transistor T5. The global shutter is implemented by holding photo-sensor PD to VGS until the image acquisition window, at such time the global shutter signal GS is de-asserted globally to pixel array 105 by global shutter driver 440 and the photo-sensors PD commencing image acquisition. The presence of the global shutter transistors T5 allows all pixel cells 405 of the pixel array to integrate light simultaneously. For high speed image or video applications, a global shutter may be preferable to minimize motion distortion otherwise formed by rolling shutter implementations. Image data transfer and FD node resets are controlled by transfer signal TX and the reset signal RST, respectively.

During the ambient light sensing mode, incident ambient light is permitted to charge the photo-sensor PD. Again, since the intensity of ambient light may less than the intensity of incident image light during the image acquisition mode, the charges accumulated on the photo-sensors PD in each column are summed on local sensing lines 430 and then summed among columns on global sensing line 425 through switches 415. Global shutter transistor T5 couples the photo-sensors PD to local sensing line 430 via assertion of the global shutter signal GS during the ALD mode. During the ALD mode, readout circuitry 110, and in some cases the source follower transistors T3, are disabled or otherwise placed into a low power state.

Figure 5:
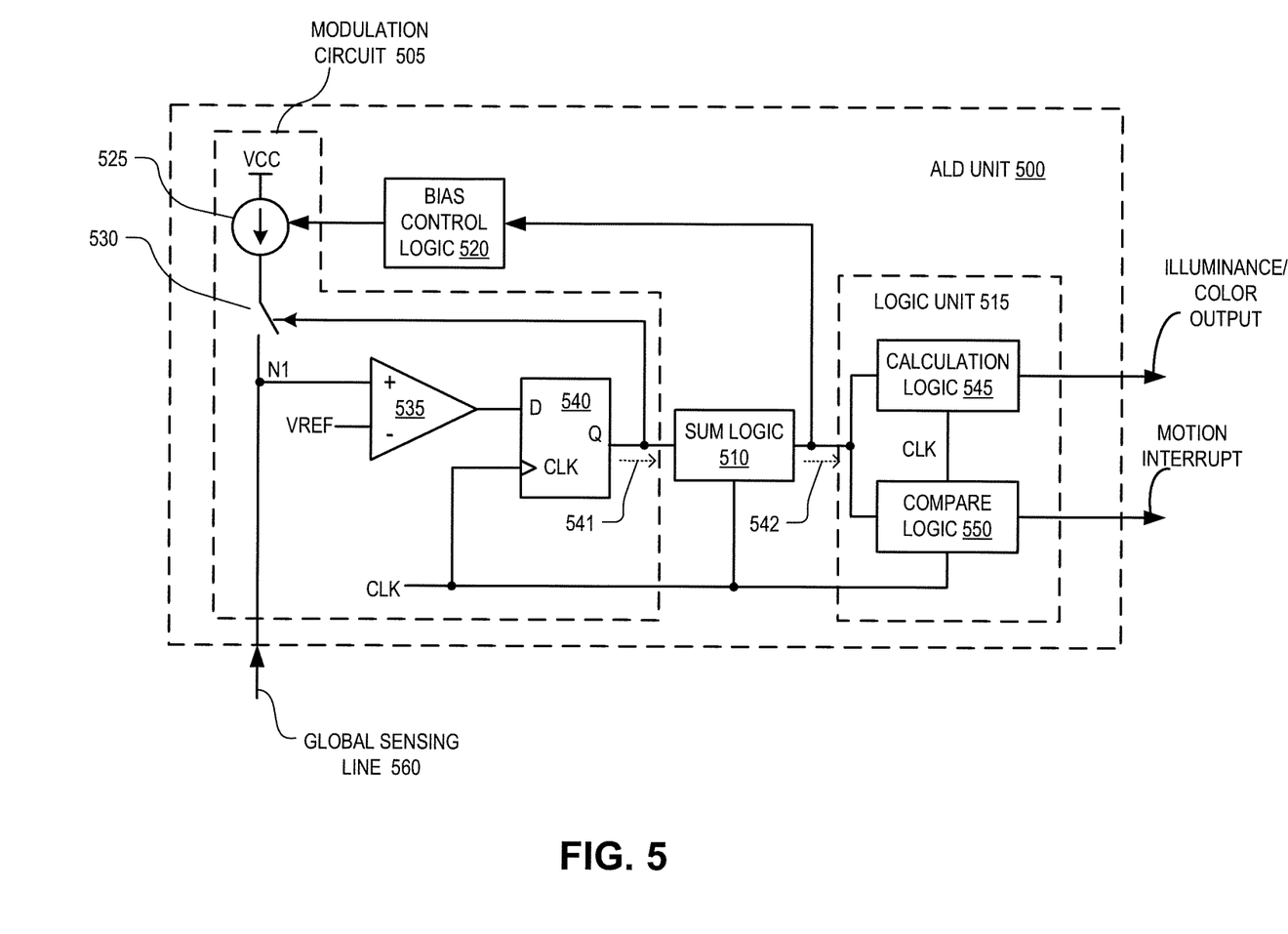
FIG. 5 is a functional block diagram illustrating an ALD unit, in accordance with an embodiment of the disclosure.

FIG. 5 is a functional block diagram illustrating an ALD unit 500, in accordance with an embodiment of the disclosure. ALD unit 500 is one possible implementation of ALD circuit 125. The illustrated embodiment of ALD unit 500 includes a modulation circuit 505, sum logic 510, logic unit 515, and bias control logic 520. The illustrated embodiment of modulator circuit 505 includes a charging source 525, a switch 530, a comparator 535, and a latch 540. The illustrated embodiment of logic unit 515 includes calculation logic 545 and compare logic 550.

In one embodiment, ALD unit 500 operates as a first-order delta-sigma analog-to-digital converter ("ADC") that converts a variable analog signal on global sensing line 560 into a modulated signal output by comparator 535. The modulated signal is then synchronized to the clock signal CLK by latch 540 and output on sample output Q as modulated signal 541. Modulated signal 541 is fed back to a control terminal of switch 530 (e.g., transistor switch) to selectively enable/disable switch 530. When switch 530 is closed circuited, node N1 is coupled to charging source 525. Comparator 535 may be implemented with an analog comparator for comparing the voltage at node N1 with a reference voltage VREF. Latch 540 may be implemented as a flip-flop, such as a D flip-flop having a sample input D, a sample output Q, and a clock input CLK. The operation of modulation circuit 505 is discussed in detail below in connection with FIG. 6.

In one embodiment, charging source 525 is a current source. In one embodiment, charging source 525 is a variable charging source capable of charging node N1 at a variable rate selected by bias control logic 520. Bias control logic 520 compensates for the intensity of ambient light and adjusts the charging rate of charging source 525 appropriately. By adjusting the charging rate of charging source 525, the luminance range of ALD unit 500 may be adjusted to compensate for a stronger/weaker signals output from the pixel array.

Sum logic 510 is coupled to receive modulated signal 541 and the clock signal CLK. Based upon modulated signal 541 and the clock signal CLK, sum logic 510 sums or integrates modulated signal 541 over time to generate a digital value 542. In other words, digital value 542 is proportional to the toggle frequency of modulated signal 541 summed over a period of time, which is proportional to the intensity of the ambient light incident upon the pixel array, as discussed in connection with FIG. 6. In one embodiment, sum logic 510 is implemented in hardware using digital signal processing ("DSP") techniques. Digital value 542 is fed back to bias control logic 520 to compensate for larger values (i.e., higher intensity ambient illumination) by increasing the bias current of charging source 525.

Digital value 542 is further provided to logic unit 515 for generating one or more ambient light signals 130. For example, compare logic 550 may include a digital comparator and buffer (e.g., latch). The buffer may store digital values 542 from previous cycles and the comparator used to threshold changes between the current digital value 542 and a previous digital value 542. If the changes are sufficiently large, then compare logic 550 may generate the ambient light signal as a motion or proximity interrupt signal. In one embodiment, switches 215 or 415 may be selectively applied to separately read out ambient light data from different zones (e.g., quadrants or halves) of pixel array 105 and the digital values 542 obtained from these zones can be compared and thresholded to implement another motion sensing function. In this case, the ambient light signal is output as a motion interrupt signal indicating that a threshold level of motion within the field of view of pixel array 105 as been sensed. In an alternative embodiment, each zone of pixel array 105 may be coupled to an independent ALD circuit, which is coupled to the associated zone with an independent set of local sensing lines, global sense line, and switch to facilitate parallel readout of the ambient light data from each zone.

Calculation logic 545 may include a multiplier circuit (e.g., scaler) to convert digital value 542 into an overall luminance value for the pixel array. In one embodiment, local sensing lines 230 or 430 may each be coupled to pixels of only a given color. By color selective assertion of switches 215 or 415, color specific ambient light data may be read separately into ALD unit 500 and calculation logic 545 used to generate the ambient light signal as a series of color signals (e.g., red, green, blue intensity values). In one embodiment, imaging system 100 may include multiple ALD circuits 125 (e.g., three), one for each color group of pixels (e.g., red, green, blue color groups). These multiple ALD circuits 125 may be coupled to their corresponding color group of pixels within the pixel array with their own set of repeated global sensing line, local sensing lines, and switches.

Figure 6:
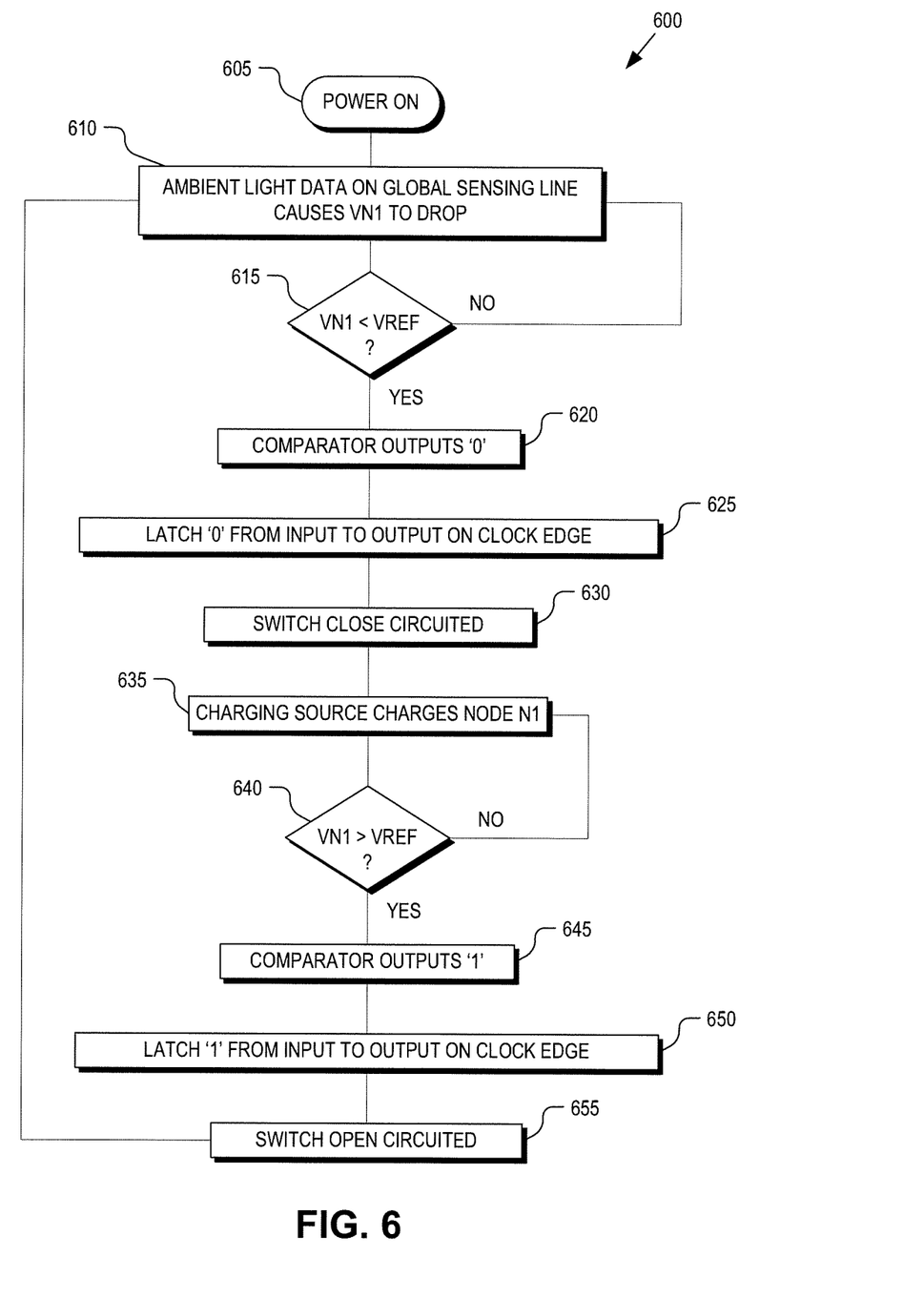
FIG. 6 is a flow chart illustrating a process of operation of a modulation circuit within the ALD unit, in accordance with an embodiment of the disclosure.

FIG. 6 is a flow chart illustrating a process 600 of operation of modulation circuit 505, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated.

In a process block 605, ALD unit 500 is powered on and ambient light data is transferred to global sensing line 560 from photo-sensors within pixel array 105. In a process block 610, the ambient light data (e.g., photo-generated electron charges) has the effect of pulling down node N1 coupled to the positive input of comparator 535 towards ground (GND). It should be appreciated that the circuit of FIG. 5 may be modified to pull node N1 up towards the high supply voltage VCC using positive photo-generated charge carriers (i.e., holes) instead.

In a decision block 615, when the voltage on node N1 is pulled below the reference voltage VREF coupled to the negative terminal of comparator 535, the modulated signal from comparator 535 is toggled low to '0' (process block 620). The modulated signal output by comparator 535 is synchronized to the clock signal CLK by latch 540. In a process block 625, latch 540 latches the '0' value on its sample input D to its sample output Q.

Modulated signal 541 (synchronized version of the modulated signal output from comparator 535) is fed back to control switch 530 and selectively enables/disables charging of node N1. In a process block 630, the '0' value of modulated signal 541 causes switch 530 to close circuit thereby coupling charging source 525 to node N1. In a process block 635, charging source 525 commences charging node N1 until voltage (VN1) on node N1 is pulled above VREF (decision block 640). Once VN1 is greater than VREF, comparator 535 toggles its output high '1' (process block 645), which is then latched by latch 540 from its sample input D to its sample output Q (process block 650). Accordingly, latch 540 operates to generate a '0' pulse or a '1' pulse according to the voltage VN1 on node N1. The pulses have a pulse width determined by the width of the clock signal CLK. Finally, in process block 655, switch 530 is open circuited under control of modulated signal 541. Process 600 then returns to process block 610 and repeats to generate modulated signal 541.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize. For example, in one embodiment, RS transistor T4 may be omitted from the pixel cells. The omission of RS transistor T4 would not affect the operation of the pixel cells during ambient light detection mode. In one embodiment two or more photodiodes share the pixel circuitry of a pixel cell, such as reset transistor, source follower transistor or row select transistor.

Modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. An image sensor, comprising:
 a pixel array including a plurality of pixel cells organized into rows and columns, the pixel array for capturing image data and ambient light data;

readout circuitry coupled via column bit lines to the pixels cells to read out the image data along the column bit lines;

an ambient light detection ("ALD") unit selectively coupled to the pixel array to readout the ambient light data and to generate an ambient light signal based on ambient light incident upon the pixel array;

control circuitry coupled to the pixel array to control time sharing of the pixels cells between the readout circuitry during an image acquisition mode of operation of the image sensor and the ALD unit during an ambient light sensing mode of operation of the image sensor;

local sensing lines each coupled to a corresponding group of the pixel cells to combine the ambient light data from the corresponding group of the pixels cells;

a global sensing line coupled to the ALD unit and selectively coupled to the local sensing lines for combining the ambient light data received from the local sensing lines; and a plurality of switches each coupled between the global sensing line and a corresponding one of the local sensing lines, wherein the control circuitry is coupled to control the switches.

2. The image sensor of claim 1, wherein the control circuitry is coupled to the readout circuitry to enable the readout circuitry during the image acquisition mode of operation and to disable the readout circuitry during the ambient light sensing mode of operation of the image sensor and to decouple the ALD unit from the pixel array during the image acquisition mode of operation and to couple the ALD unit to the pixel array during the ambient light sensing mode of operation.

3. The image sensor of claim 1, wherein each of the local sensing lines are each coupled to a corresponding row of the pixel cells to readout the ambient light data along the rows while the image data is readout along the columns via the column read out lines.

4. The image sensor of claim 1, wherein the local sensing lines are coupled to a channel terminal of a reset transistor within the pixel cells and the switches selectively couple the local sensing lines to a reset voltage for resetting the pixel cells during the image acquisition mode of operation and to the global sensing line for reading out the ambient light data during the ambient light sensing mode of operation.

5. The image sensor of claim 1, wherein each of the local sensing lines are each coupled to a corresponding column of the pixel cells to readout the ambient light data along the columns and the image data is readout along the columns via the column read out lines.

6. The image sensor of claim 1, wherein each of the pixel cells of the pixel array includes a global shutter transistor and a transfer transistor both coupled to a photosensitive element and wherein a channel of the global shutter transistor is coupled between the photosensitive element and a given local sensing line.

7. The image sensor of claim 6, wherein during the image acquisition mode of operation the global shutter transistor is coupled to provide a global shutter and the transfer transistor is coupled to transfer out the image data to the readout circuitry, wherein during the ambient light sensing mode of operation the ambient light data is coupled to the ALD unit through the channel of the global shutter transistor.

8. The image sensor of claim 1, wherein the ALD unit comprises:

a modulator circuit coupled to the global sensing line to generate a modulated signal based on the ambient light data that toggles at a rate substantially proportional to an intensity of the ambient light incident upon the pixel array;

a sum logic coupled to the modulator circuit to convert a toggle rate of the modulated signal to a digital value that is indicative of the intensity of the ambient light; and a logic unit coupled to receive the digital value and to generate the ambient light signal if the digital value satisfied a predetermined condition.

9. The image sensor of claim 8, wherein the logic unit comprise compare logic that compares a current value of the digital value to a previous value and generates the ambient light signal as an interrupt signal if a difference between the current value and the previous value satisfies a threshold difference.

10. The image sensor of claim 8, wherein the logic unit comprises calculation logic that converts the digital value to a luminance value and outputs the ambient light signal as the luminance value.

11. The image sensor of claim 8, wherein the logic unit comprises calculation logic that converts the digital value to a color value and outputs the ambient light signal as the color value.

12. The image sensor of claim 1, further comprising:

a plurality of ALD units; and a plurality of sets of local sensing lines, wherein each of the sets of local sensing lines couples to a different color group of the pixel cells; and a plurality of global sensing lines each selective coupling a corresponding one of the ALD units to a corresponding set of the local sensing lines such that each of the ALD units measures ambient light of a single color.

13. A method of time sharing pixel cells of a pixel array within an image sensor between image acquisition and ambient light detection ("ALD") functions, the method comprising:

acquiring image data with the pixel cells during an image acquisition mode of the image sensor;

reading out the image data from the pixel cells along column bit lines into readout circuitry;

transitioning the image sensor from the image acquisition mode to an ALD mode;

acquiring ambient light data with the pixels cells during the ALD mode; and reading the ambient light data from the pixel cells into an ALD circuit to generate an ambient light signal based upon ambient light incident on the pixel cells, wherein transitioning the image sensor from the image acquisition mode to the ALD mode comprises coupling channels of global shutter transistors within the pixel cells to the ALD circuit, wherein reading the ambient light data from the pixel cells into the ALD circuit comprises reading the ambient light data through the channels of the global shutter transistors.

14. The method of claim 13, wherein transitioning the image sensor form the image acquisition mode to the ALD mode comprises:

disabling the readout circuitry to reduce power consumption of the image sensor during the ALD mode.

15. The method of claim 14, wherein transitioning the image sensor form the image acquisition mode to the ALD mode further comprises:

disabling a source-follower transistor within the pixel cells to reduce power consumption of the image sensor during the ALD mode.

16. The method of claim 13, wherein the ambient light signal comprises a luminance value indicating an overall intensity of the ambient light incident on the pixel array.

17. The method of claim 13, wherein the ambient light signal comprises separate color intensity signals, wherein the ambient light data is separately readout from the pixel array based on separate color groups of color pixel cells.

18. The method of claim 13, wherein the ambient light signal comprises a motion interrupt signal, wherein the ambient light data is separately readout from different zones of the pixel array and the ambient light data from the different zones compared to generate the motion interrupt signal.

* * * * *